March 11, 1952 J. H. CLARK 2,588,906
CITRUS FRUIT PRESS
Filed Nov. 25, 1949 3 Sheets-Sheet 1
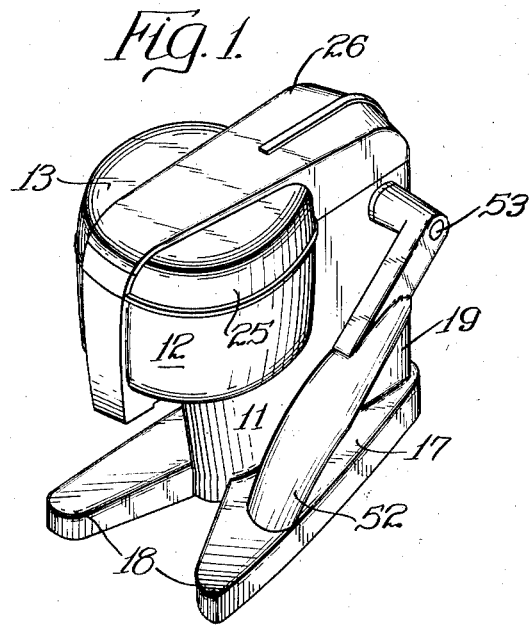
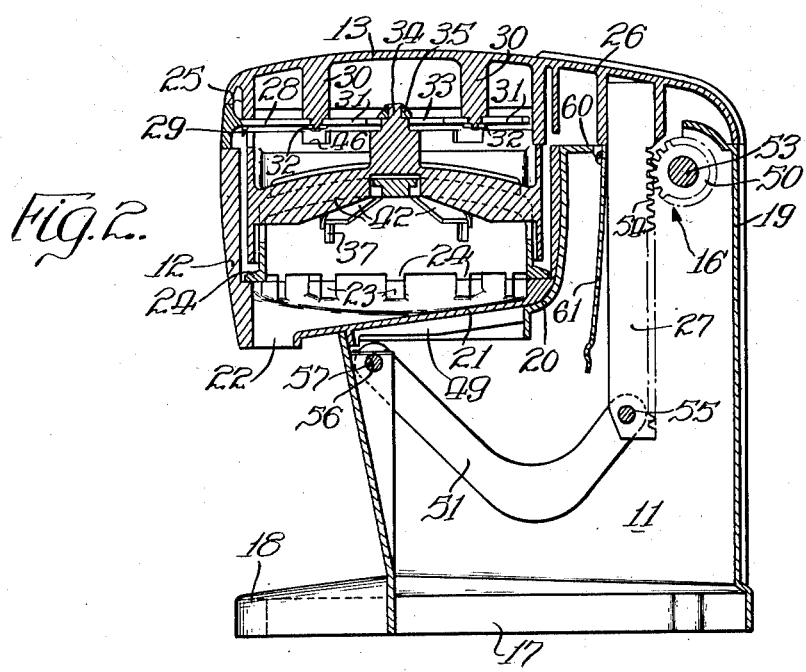
INVENTOR.
Jesse H. Clark
BY
Cumming & Cumming
Attys.

March 11, 1952 J. H. CLARK 2,588,906
CITRUS FRUIT PRESS
Filed Nov. 25, 1949 3 Sheets-Sheet 2
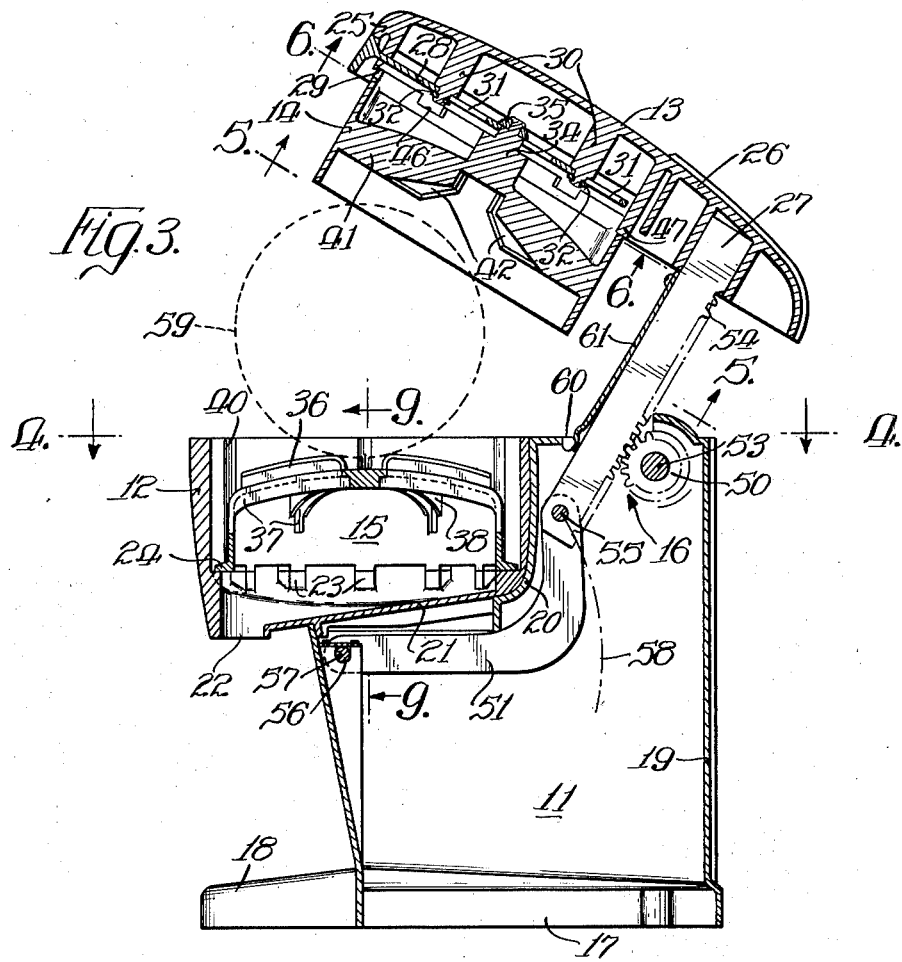
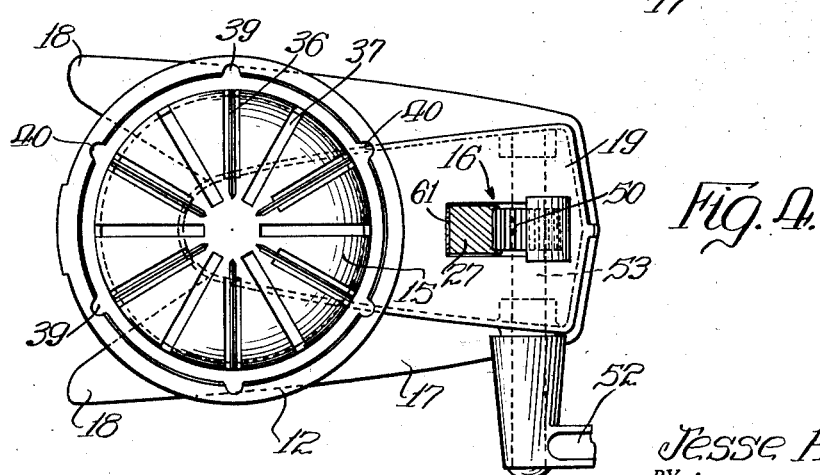
INVENTOR.
Jesse H. Clark
BY
Attys.

March 11, 1952 — J. H. CLARK — 2,588,906
CITRUS FRUIT PRESS
Filed Nov. 25, 1949 — 3 Sheets-Sheet 3
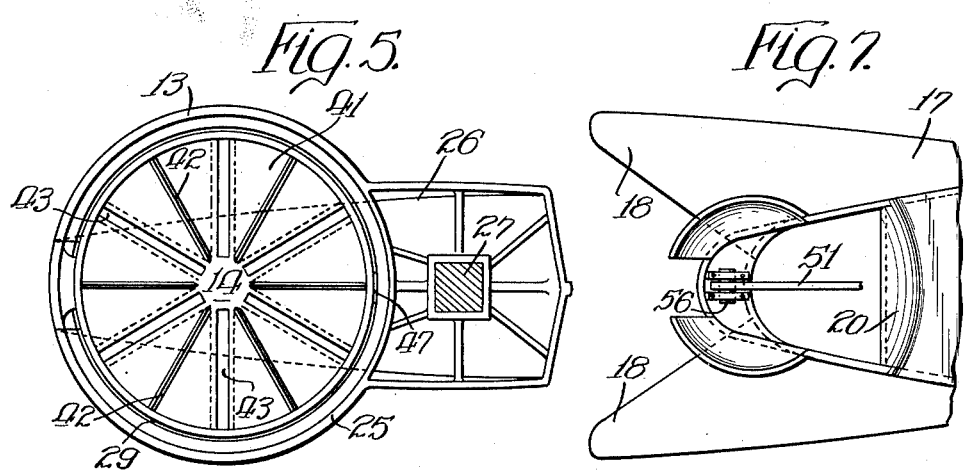
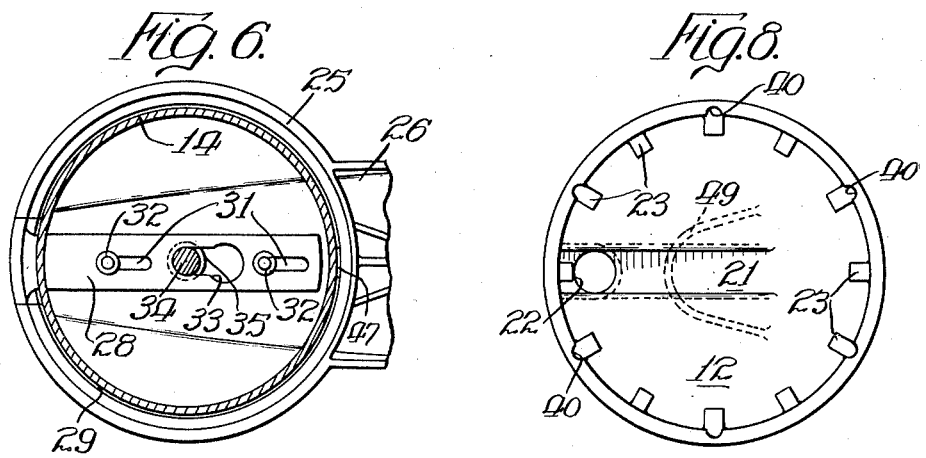
INVENTOR.
Jesse H. Clark Patented Mar. 11, 1952

2,588,906

UNITED STATES PATENT OFFICE 2,588,906

CITRUS FRUIT PRESS

Jesse H. Clark, Chicago, Ill., assignor to Cory Corporation, Chicago, Ill., a corporation of Delaware Application November 25, 1949, Serial No. 129,387

3 Claims. (Cl. 100—42)

The main objects of this invention are to provide an improved form of apparatus for expressing juices from citrus fruits and the like; to provide an improved form and arrangement of relatively movable parts for cutting and compressing the fruit or vegetable under operation and for straining the juice from the pulp thereof; to provide an improved form and arrangement of juice-expressing elements having provision for expediting ready removal for the purpose of cleaning; and to provide a juicer of this kind which is simple and inexpensive to manufacture, and which will secure the maximum of juice with the minimum amount of exertion.

In the accompanying drawings:

Figure 1 is a perspective view of an improved form of juice-expressing apparatus constructed in accordance with this invention, the parts being shown in their closed or inactive positions;

Fig. 2 is an enlarged vertical sectional elevation thereof;

Fig. 3 which is a similar view shows the operating parts in their open or relatively retracted positions;

Fig. 4 is a sectional view, taken on line 4—4 of Fig. 3;

Fig. 5 is a similar view, taken on line 5—5 of Fig. 3;

Fig. 6 is a transverse sectional view, taken on line 6—6 of Fig. 3;

Fig. 7 is a fragmentary plan view of the forward end of the supporting base with the juice-collection cup removed;

Fig. 8 is a plan view of the juice cup;

Fig. 9 is a fragmentary sectional view, taken on line 9—9 of Fig. 3; and

Fig. 10 is an enlarged fragmentary detail of the lug and notch means whereby the upper juice-expressing element is properly positioned on the reciprocating arm.

A citrus fruit press constructed in accordance with this invention comprises a base member 11 mounting a cup 12 and an arm-supported cap 13 with which is associated a pair of upper and lower elements 14 and 15, one movable toward and from the other, by action of an operating mechanism 16 to cut, compress, and strain the juice from a whole fruit or vegetable when placed between the elements 14 and 15.

The base 11 may be a light-metal casting formed with a foot 17 having a pair of forwardly-extending V-shaped toes 18, and mounting a hollow standard 19 at the upper end of which is provided a support 20 for the juice cup 12. As shown, this cup is of cylindrical form with a forwardly-inclined bottom 21 terminating in a downwardly disposed drain spout 22. A plurality of circumferentially spaced lugs 23 extend upwardly from the cup bottom 21 adjacent its sides to provide an elevated support for an outwardly extending flange 24 on the margin of the lower element 15, the spaces between these lugs receiving the expressed juices which then drain down along the inclined bottom 21 for discharge through the spout 22. The cap 13 which is hollow on its under side is formed with a depending marginal wall 25 in integral connection with an arm 26 that is supported on a post 27 which forms a part of the operating mechanism 16. The cap mounts a slide 28 whereby the upper juice-expressing element 14 is releasably secured with its upper circular edge resting within a seat 29 that is formed on the under face of the cap wall 25.

The slide 28 (see Figs. 3 and 6) is supported on a pair of spaced depending studs 30 whose ends extend through slots 31 in the slide and have washers 32 secured thereto to retain the slide in place. A keyhole slot 33 which is formed in the slide 28 intermediate the slots 31 is arranged to engage a post 34 upstanding from the upper juice-expressing element 14 so as to hold the same on the circular seat 29 (see Fig. 2). A head 35 on the end of the post 34 holds the upper element 14 in place when the slide is retracted. The outer end of the slide is shaped to conform with the contour of the outer face of the wall 25 of the cap 13 so as to have it normally appear as a part thereof.

The lower juice-expressing element 15 is of hollow cylindrical form with a dome top mounting upwardly extending, radially disposed knives 36 alternating with radially disposed recesses 37 which are formed in downwardly extending, radially disposed ribs 38 (see Figs. 3 and 9). The outwardly extending marginal flange 24, when rested on the cup lugs 23, supports the lower juice-expressing element 15 in elevated position above the cup bottom. The flange 24 is provided with outstanding circumferentially spaced nodes 39, as shown in Figs. 2, 4, and 9, to register with certain vertical grooves 40 in the cup 12, thereby to hold the lower element fixedly against rotation when assembled within the cup. Drainage of the expressed juices running down the outside of the lower element 15 proceeds toward the inclined bottom of the cup and then outwardly through its spout 22.

The upper juice-extracting element 14 is likewise of cylindrical form, having a transverse web 41 which mounts the post 34 whereby the element is secured to the cap 13, and whereon is formed a plurality of downwardly extending, radially disposed knives 42 alternating with radially disposed slots 43. The diameter of the cylindrical part of the upper element 14 is sufficiently larger than the diameter of the lower element 15 to permit their telescoping relationship (see Fig. 2) when the cap 13 is in its fully closed position on the cup 12. When the elements 14 and 15 are in such position, the knives 36 and 42 carried by these respective elements are then in register for entry within the slots 43 and 37.

In order to insure proper registering of these knives and slots, the elements 14 and 15, the cup 12, and the cap 13 are formed with interfitting slots and lugs. For the upper element 14 and the cap 13 there may be provided one or more V-shaped slots 46 formed on its upper edge to register with a similarly shaped lug 47 depending at a suitable point from the seat 29 (see Fig. 10). The lower element 15 is indexed in a predetermined position by the node and groove connection, 39 and 40, already noted. The cup itself is held releasably in a fixed position upon the support 20 which is bifurcated to receive in its center slot a complementary rib 48 which depends from the cup bottom, in conjunction with a depending cross rib 49 which is adapted to lie inwardly of the front wall of the standard 19.

The operating mechanism 16 comprises a gear 50, the post 27, a link 51, and a handle or lever 52. The gear 50 is secured to a shaft 53 which is journaled on the standard 19 of the base 11 rearwardly of the cup support 20, and substantially in alignment with the plane of the contacting surfaces of the elements 14 and 15 when in their fully closed positions. A rack 54 formed on the rear of the post 27 meshes with the gear 50 so that rotation of the gear effects a vertical reciprocation of the post 27 and the parts mounted thereon.

The link 51 which is L-shaped has its upper inner end pivoted at 55 to the lower end of the post 27, and its lower outer end is pivotally supported by a pin 56 rested in notches 57 that are formed in the standard 19 of the base 11 under the bottom of the cup 12 and adjacent the axis thereof. The handle 52 which may be of any suitable contour is secured to the shaft 53 so as to permit it to execute a sufficient movement to effect a full reciprocation of the post 27, as shown by the arc 58. In reaching the fully up position, the handle desirably executes a movement which brings it over the top and into the quadrant therebeyond so that its weight will resist a reverse down movement of the parts.

The coaction of the shaft 53, the rack 54, and the link 51 results in the interconnecting pin 55 moving through the arc indicated at 58 (see Fig. 3). During substantially the lower half of the arc the post 27 is moving through a path which is approximately vertical and the upper element 14 recedes and advances toward the lower element 15 approximately axially of the cup 12. During substantially the upper half of the arc 58 the post 27 is swinging in a vertical plane and the upper element 14 traverses an arc as it moves into and out of the fully retracted position rearwardly of the axis of the cup 12.

When the upper juice-expressing element 14 is being moved to compress a piece of fruit (indicated by the dotted outline 59 in Fig. 3) there is a thrust on the post 27 rearwardly toward the axis of the gear shaft 53. As a consequence the rack 54 is continually maintained in full mesh with the gear 50. This eliminates any wearing action of the post 27 on the rim 60 of the slot in the base 11 through which the post 27 reciprocates. A leaf spring 61 may be affixed near one end to the post 27 to exert a light pressure against the rim 60 at the top of the standard 19, thereby preventing a too-rapid down movement of the cap and its associated juice-expressing element, in response to gravity.

It will be observed that the mechanism of the present juicer is exceedingly simple. It is at all times very effective for delivering a powerful down thrust on to the upper juice-expressing element for cooperation with the complementary lower element to express the juices from a fruit or vegetable that may be rested thereon. The movement of the upper juice-expressing element is produced by motion transmitted thereto from the cap. The two move together, and in the up-movement they proceed first vertically and then through an arcuate path. On the down movement they proceed through the same two stages, but in reverse order. The parts entering into the mechanism for producing this movement are very simple, and minimize friction which is developed in operation.

The means whereby the upper juice-extracting element is secured in place is also very simple. It is always concealed, and the slide is effective to lock this element to the cap only when the former is properly indexed for the purpose. The lower juice-expressing element, when indexed properly with the cup, is then rotatively positioned so that the knives of the two elements will be in staggered relation opposite the slots with which they coact. As a result, when pressure is applied the fruit is first severed and then compressed. This facilitates the operation of removing the juices from the fruit.

The cup when rested on its support is releasably retained thereon in a fixed rotative position. It is freely removable after a slight lifting motion, and the lower juice-expressing element is also freely removed from the cup. To facilitate this removal, it is desirable that the cup be first removed from its support. The operating mechanism is removed from the two juicer elements and the cup, so it is maintained clean and protected at all times.

In the down movement of the cap, together with the upper juice-expressing element carried thereby, the spring retarding means maintains a desired light friction. The force required for operation of the juicer is not appreciably increased by the presence of this spring which is effective, however, to prevent an over-rapid movement of the parts on the down stroke.

Variations and modifications in the details of structure and arrangement of the parts may be resorted to within the spirit and coverage of the claims.

I claim:

1. A juicer of the class described comprising a base, a bottom-spouted cup supported on said base, the bottom of the cup being inclined downwardly and forwardly from the rear wall of the cup and terminating short of the front wall thereof, and the spout depending from the lower edge of said bottom between the same and the front wall of the cup, an arm reciprocatingly mounted on said base, a pair of complementary juice-expressing elements having radially disposed slots therein, one of said elements being of hollow cylindrical form with a peripheral base flange and an arcuate shaped dome having a plurality of upwardly extending radially disposed knives interposed between the radially disposed slots, said one element being adapted to rest in a predetermined rotative position with the cylindrical wall of said element spaced from the wall of said cup to permit gravity drainage of juice through the annular space therebetween to said inclined bottom and spout of the cup, the other said element being of hollow cylindrical form permitting telescoping relationship with said one element and having the interior thereof spanned by downwardly depending radially disposed knives interposed between the radially disposed slots, means for attaching said other element to said arm so as to locate the knives and slots thereon in axial alignment with the slots and knives respectively in said one element, and means for reciprocating said arm to move said elements toward and away from each other.

2. A juicer of the class described comprising a base, a cup on said base formed with an inclined bottom terminating in a downwardly disposed spout, said bottom extending downwardly and forwardly from the back of the cup and terminating short of the front thereof, and the spout depending from the lower edge of the bottom and located between the same and the front of the cup, a plurality of circumferentially spaced supporting means disposed within the cup, a pair of complementary juice-expressing elements having radially disposed slots therein, one of said elements being of hollow cylindrical form with a base flange for resting on said cup supporting means spaced from the cup walls to permit gravity drainage of juices downwardly to said cup bottom and spout, said one element being formed with an arcuate shaped dome having a plurality of upwardly extending radially disposed knives interposed between radially disposed slots, the other said element being of hollow cylindrical form permitting telescoping relationship with said one element and having the interior thereof spanned by downwardly extending radially disposed knives interposed between the radially disposed slots, an arm mounted for movement on said base and provided with an inverted cup cooperating with the cup of the base to form a closed casing, a slide arranged within said inverted cup for releasably locking said other element thereto, and means for operating said arm to move said elements into and out of juice-expressing relationship.

3. A juicer of the class described comprising a base, a cup on said base formed with an inclined bottom terminating in a downwardly disposed spout located within the contour of said cup, a plurality of circumferentially spaced supporting means disposed within the cup, a pair of complementary juice-expressing elements having radially disposed slots therein, one of said elements being of hollow cylindrical form with a base flange for resting on said cup supporting means spaced from the cup walls to permit gravity drainage of juices downwardly to said cup bottom and spout, said one element being formed with an arcuate shaped dome having a plurality of upwardly extending radially disposed knives interposed between the radially disposed slots, the other of said element being of hollow cylindrical form permitting telescoping relationship with said one element and having the interior thereof spanned at a point spaced from the lower edge thereof by downwardly extending radially disposed knives interposed between radially disposed slots, an arm mounted for movement on said base and provided with an inverted cup cooperating with the cup of the base to form a closed casing, a slide arranged on said arm for releasably locking said other element thereto interiorly of the inverted cup, interfitting means on said elements and on the cup of the base and arm adapted to insure the rotative positioning of said elements on said cup of the base and arm respectively to locate said knives and slots in registering alignment, and means for operating said arm to move said elements into and out of juice-expressing relationship.

JESSE H. CLARK.

REFERENCES CITED

The following references are of record in the file of this patent:

UNITED STATES PATENTS

| Number | Name | Date |
|---|---|---|
| 61,163 | Clarke | Jan. 15, 1867 |
| 172,505 | Sammis | Jan. 18, 1876 |
| 1,128,050 | Roberts | Feb. 9, 1915 |
| 1,958,570 | Flegel | May 15, 1934 |
| 2,168,430 | Myers | Aug. 8, 1939 |
| 2,177,939 | Johnson | Oct. 31, 1939 |
| 2,394,763 | Grant | Feb. 12, 1946 |
| 2,404,382 | Klein | July 23, 1946 |